United States Patent
Guo et al.

(10) Patent No.: US 11,449,869 B2
(45) Date of Patent: Sep. 20, 2022

(54) METHOD AND SYSTEM FOR FACILITATING PAYMENT BASED ON FACIAL RECOGNITION

(71) Applicant: Alibaba Group Holding Limited, Grand Cayman (KY)

(72) Inventors: Lei Guo, Hangzhou (CN); Xuan Jiang, Beijing (CN); Jun Ma, Beijing (CN); Shumin Lin, Beijing (CN); Ting Wang, Beijing (CN)

(73) Assignee: Advanced New Technologies Co., LTD, George Town (KY)

( * ) Notice: Subject to any disclaimer, the term of this patent is extended or adjusted under 35 U.S.C. 154(b) by 96 days.

(21) Appl. No.: 16/561,931

(22) Filed: Sep. 5, 2019

(65) Prior Publication Data
US 2020/0097977 A1  Mar. 26, 2020

(30) Foreign Application Priority Data
Sep. 20, 2018  (CN) .......................... 201811099089.6

(51) Int. Cl.
| | | |
|---|---|---|
| *G06Q 20/40* | (2012.01) | |
| *G06Q 20/20* | (2012.01) | |
| *G06Q 20/32* | (2012.01) | |
| *G06V 40/16* | (2022.01) | |

(52) U.S. Cl.
CPC ....... *G06Q 20/40145* (2013.01); *G06Q 20/20* (2013.01); *G06Q 20/325* (2013.01); *G06V 40/168* (2022.01)

(58) Field of Classification Search
CPC ......... G06Q 20/40145; G06Q 20/4014; G06Q 20/401; G06Q 20/40; G06Q 20/38; G06Q 20/00; G06Q 20/20; G06Q 20/206; G06Q 20/18; G06Q 20/325; G06Q 20/32; G06Q 20/30; G06K 9/00268; G06K 9/00275; G06K 9/00281; G06K 9/00221; G06K 9/00248; G06K 9/00261; G06K 9/00
See application file for complete search history.

(56) References Cited

U.S. PATENT DOCUMENTS

| | | | |
|---|---|---|---|
| 8,577,810 B1* | 11/2013 | Dalit ....................... | G06F 21/35 705/16 |
| 9,881,295 B1* | 1/2018 | Buddhavarapu ..... | G06Q 20/322 |
| 10,924,476 B2 | 2/2021 | Hecker | |

(Continued)

FOREIGN PATENT DOCUMENTS

| | | | |
|---|---|---|---|
| WO | 20170148258 | 9/2017 | |
| WO | WO-2017148258 A1 * | 9/2017 | ............. G06Q 20/40 |

*Primary Examiner* — Namrata Boveja
*Assistant Examiner* — Divesh Patel
(74) *Attorney, Agent, or Firm* — Shun Yao; Yao Legal Services, Inc.

(57) ABSTRACT

One embodiment described herein provides a payment-processing apparatus. The payment-processing apparatus can include a facial-information-collection module configured to collect facial information of a customer, a first communication interface configured to communicate with a point-of-sale (POS) terminal, and a second communication interface configured to communicate with a remote computing device and send the collected facial information to the remote computing device, thereby allowing the remote computing device to identify a customer account based on the collected facial information.

19 Claims, 8 Drawing Sheets

(56) References Cited

U.S. PATENT DOCUMENTS

| | | | |
|---|---|---|---|
| 2012/0116887 A1* | 5/2012 | Norair | G06Q 20/322 |
| | | | 455/41.1 |
| 2013/0015946 A1* | 1/2013 | Lau | G06F 21/32 |
| | | | 340/5.2 |
| 2013/0103511 A1* | 4/2013 | Fisher | G06Q 30/0635 |
| | | | 705/17 |
| 2014/0063256 A1 | 3/2014 | Mongeon | |
| 2014/0331189 A1* | 11/2014 | Lee | G06Q 20/18 |
| | | | 715/863 |
| 2015/0081550 A1 | 3/2015 | Priebatsch | |
| 2016/0163029 A1* | 6/2016 | Gibbon | G06V 20/10 |
| | | | 382/190 |
| 2018/0053190 A1* | 2/2018 | Gurunathan | G06Q 20/40145 |
| 2018/0336687 A1 | 11/2018 | Mudretsov | |
| 2018/0374099 A1 | 12/2018 | Litsur | |

* cited by examiner

FIG. 4 (CON.)

METHOD AND SYSTEM FOR FACILITATING PAYMENT BASED ON FACIAL RECOGNITION

RELATED APPLICATION

Under 35 U.S.C. 119, this application claims the benefit and right of priority of Chinese Patent Application No. 201811099089.6, filed 20 Sep. 2018.

BACKGROUND

Field

This disclosure is generally related to a payment system. More specifically, this disclosure is related to a payment system that uses face recognition technologies to process payment.

Related Art

Facial recognition technologies have been developed rapidly and found many applications in recent years. A facial recognition system can identify or verify a person by scanning the person's face. Such technologies have been used as access control in security systems. For example, a user can gain access to a mobile phone by allowing the mobile phone to capture an image of his face. Facial recognition systems have been compared to other biometric systems, such as fingerprint and eye iris recognition systems. Compared to fingerprint recognition and eye iris recognition, facial recognition has the advantage of being contactless and non-invasive.

In addition to access control, facial recognition technologies have find applications in areas like policing and national security. Moreover, facial recognition technologies can also be used in financial settings. More particularly, a customer of services or goods may render a payment by allowing images of his face to be captured, referred to as paying-with-a-face. However, current point of sale (POS) terminals do not support such a payment option.

SUMMARY

One embodiment described herein provides a payment-processing apparatus. The payment-processing apparatus can include a facial-information-collection module configured to collect facial information of a customer, a first communication interface configured to communicate with a point-of-sale (POS) terminal, and a second communication interface configured to communicate with a remote computing device and send the collected facial information to the remote computing device, thereby allowing the remote computing device to identify a customer account based on the collected facial information.

In a variation on this embodiment, the first communication interface can include a universal serial bus (USB) interface, a Bluetooth™ interface, or a WiFi™ interface.

In a variation on this embodiment, the second communication interface is configured to receive, from the remote computing device, a transaction-authorization code, which is generated by the remote computing device based on the identified customer account.

In a further variation, the first communication interface is configured to forward, to the POS terminal, the transaction-authorization code to allow the POS terminal to submit a payment request to the customer account based on the transaction-authorization code and a payment amount.

In a variation on this embodiment, the facial information can include one or more of: a two-dimensional (2D) image of the customer's face, a three-dimensional (3D) image of the customer's face, and a feature vector extracted from an image of the customer's face.

In a variation on this embodiment, the payment-processing apparatus can further include an input module configured to receive additional security information from the customer.

In a further variation, the second communication interface is further configured to transmit the additional security information to the remote computing device, thereby allowing the remote computing device to verify the customer's identity based on the additional security information.

In a variation on this embodiment, the payment-processing apparatus can further include a display module configured to display information associated with the identified customer account and display a payment result.

In a variation on this embodiment, the remote computing device can include a facial information database storing facial information of a plurality of customers.

In a variation on this embodiment, the POS terminal can be a standard POS terminal configured to perform standard POS operations.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system is provided for a payment system that enables paying-with-a-face. More specifically, the payment system can include a facial-information-collection device, a point of sale (POS) terminal, and a face-payment server. The facial-information-collection device and the POS terminal can be co-located at the point of sale of a vendor and the face-payment server can be located remotely. During operation, the facial-information-collection device receives a start-up command, collects the customer's facial information, and sends the customer's facial information to the remote face-payment server. The remote face-payment server uses the received facial information to identify the customer and generates a transaction-authorization code associated with the customer. The remote face-payment server returns the transaction-authorization code to the facial-information-collection device, which in turn forwards the transaction-authorization code to the POS terminal. Upon receiving the transaction-authorization code, the POS terminal sends a payment request to the remote face-payment server, which then transfers the fund from the customer's account to the vendor's account to complete the sale. This way, there is no need to make hardware changes to existing POS terminals while implementing the paying-with-a-face payment method.

In this disclosure, the terms "user" and "customer" can sometimes be interchangeable and are typically referred to a person using the system to make a payment.

A Paying-with-a-Face Payment System

Although facial recognition technologies have been mature enough for certain commercial usages (e.g., the Face ID technology used by Apple Inc.), their usages in financial domains are still in the early development stage, mostly due to their limited compatibility with existing payment systems. Implementing the paying-with-a-face technology in a large scale can be challenging, especially in the retail environment, because the current paying-with-a-face technology is not compatible with existing POS systems (e.g., cash registers) used by retailers. Replacing or upgrading current POC terminals can be very costly to retailers.

A POS (point of sale or point of service) system is a system that allows the processing and recording of transactions between their customers, at the time in which goods and/or services are purchased. A POS terminal can be a computer terminal that integrates appropriate software and hardware to perform various retail functions, such as scanning a bar code on a merchandise to determine its price, calculating the amount of the total sale, reading information off a customer's credit or debit card, transferring funds from the customer's account to the seller's account, recording the transaction, etc. In order for the paying-with-a-face technology to be widely used in retail settings, POS terminals that can collect and process customers' facial information are needed. However, replacing existing POS terminals can be costly for retailers and a less expensive solution for implementing the paying-with-a-face technology is needed.

In some embodiments, instead of replacing exiting POS terminals, the payment system that enables the paying-with-a-face technology can incorporate existing POS terminals. More specifically, the payment system can include a facial-information-collection device that is communicatively coupled to a conventional POS terminal and a remote face-payment server. The facial-information-collection device can be equipped with a facial-information-collection module configured to collect the facial information from a customer, either by scanning the customer's face or by capturing one or more images of the customer's face. The facial-information-collection device can transmit the collected customer facial information to the remote face-payment server, which uses a facial-recognition technique to identify the customer and a financial account (e.g., a bank account, a credit card account, or an account with the payment system) associated with the customer. Based on the account information, the remote face-payment server can generate a transaction-authorization code and send such a code to the facial-information-collection device. Such a transaction-authorization code can be similar to the transaction-authorization code sent from a conventional credit card payment system to a POS terminal. The facial-information-collection device can forward the transaction-authorization code to the POS terminal, which then performs its normal payment-processing operations. For example, the POS terminal can send a payment request that includes the total payment amount and the transaction-authorization code to the remote face-payment server, causing the remote server to transfer the fund from the customer's account to the retailer's account.

Figure 1:
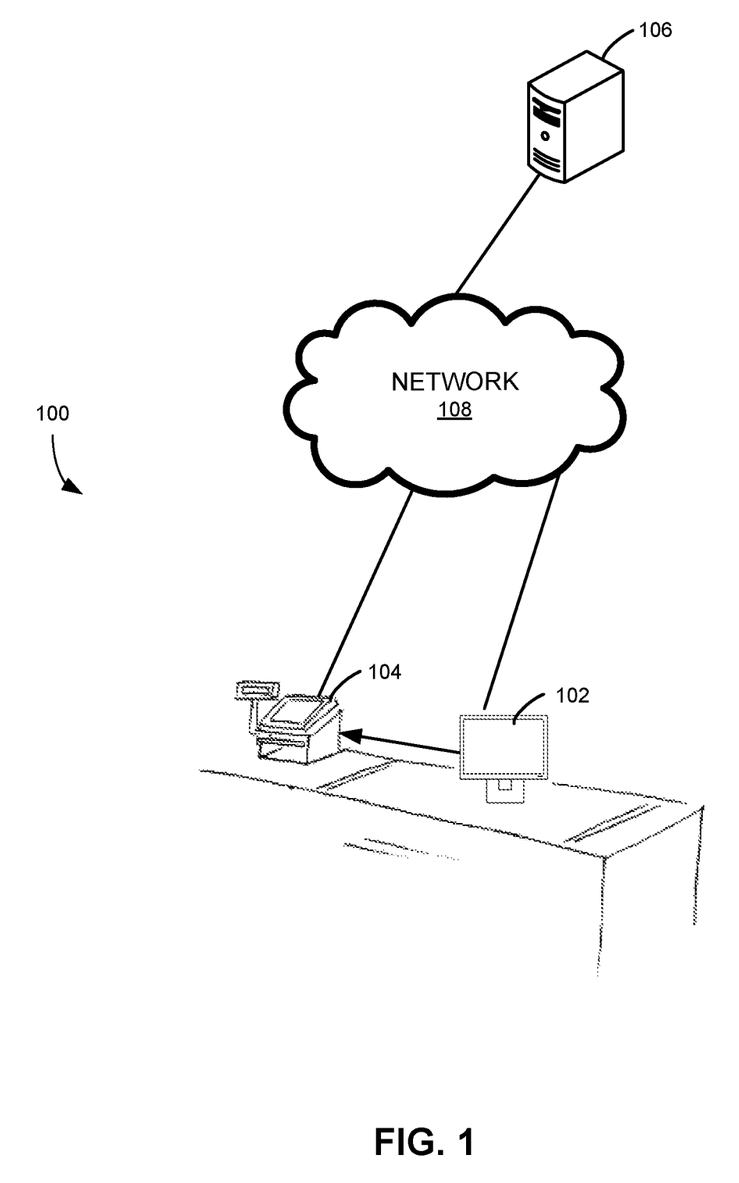
FIG. 1 illustrates an exemplary payment system, according to one embodiment.

FIG. 1 illustrates an exemplary payment system, according to one embodiment. Payment system 100 can include a facial-information-collection device 102, a POS terminal 104, and a remote face-payment server 106.

Facial-information-collection device 102 and POS terminal 104 can be co-located at the POS (e.g., a checkout stand of a supermarket) and can be coupled to each other via a wired or wireless connection. An exemplary wired connection can include a universal serial bus (USB) connection, a Peripheral Component Interconnect Express (PCIE) connection, or any other known wired serial or parallel connection. An exemplary wireless connection can include a Bluetooth™ connection or a WiFi™ connection.

Facial-information-collection device 102 can be responsible for capturing facial information of a customer and sending the captured facial information to remote face-payment server 106. POS terminal 104 can include any existing commercially available POS device, such as a conventional cash register, a proprietary POS terminal, a desktop-computer-based terminal, a laptop-computer based terminal, a tablet-computer based terminal, etc. POS terminal 104 can perform various standard POS functions, such as scanning the barcode of a merchandize to obtain the price of the merchandize, calculating the purchase sum, applying a discount or coupon, etc. POS terminal 104 can also include a card-processing unit that can read the customer's credit or debit card, in the event the customer chose not to pay with his face but with a more traditional payment method (e.g., a credit or debit card).

Facial-information-collection device 102 and POS terminal 104 can both be coupled to remote face-payment server 106 via a network 108. Network 108 can include both wired and wireless networks, such as a personal area network (PAN), a local area network (LAN), a campus area network (CAN), a metropolitan area network (MAN), a wide area network (WAN), a broadband network (BBN), the Internet, and the like.

Remote face-payment server 106 can perform various standard operations required for processing a payment, including but not limited to: identifying the customer's financial account, generating a transaction-authorization code, transferring fund from the customer's account to the merchant's account, etc. In addition, remote face-payment server 106 can perform various operations that are specific to the paying-with-a-face application. For example, remote face-payment server 106 may receive a customer's facial information from facial-information-collection device 102 and can perform a facial-recognition operation to identify the customer. Based on the customer's identity, remote face-payment server 106 can query a database to obtain the customer's account information. Moreover, to identify the customer, remote face-payment server 106 may access a facial-information database, which stores facial information of a large number of customers or users. Such information can be provided by those users when they register an account with payment system 100. Alternatively, face-payment server 106 may access a public database that stores face images or facial information of a population. In some embodiments, remote face-payment server 106 can be implemented using cloud computing. In such a scenario, instead of an individual server machine, the various server functions can be provided by a number of networked computers.

Figure 2:
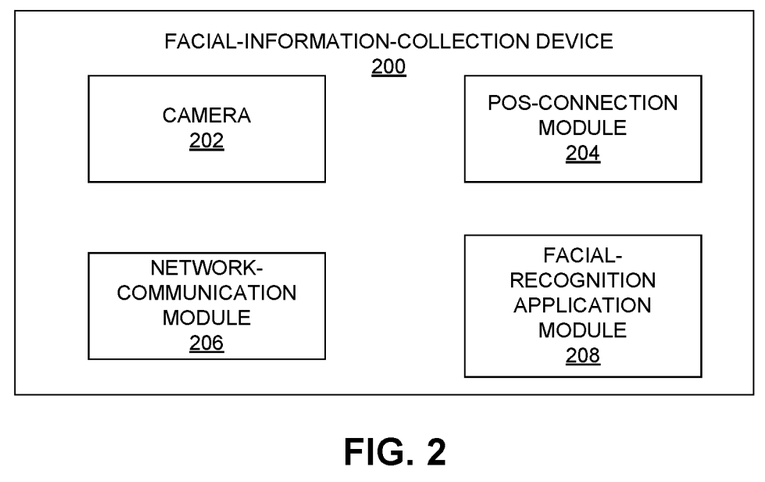
FIG. 2 illustrates a block diagram of an exemplary facial-information-collection device, according to one embodiment.

FIG. 2 illustrates a block diagram of an exemplary facial-information-collection device, according to one embodiment. Facial-information-collection device 200 can include a camera 202, a POS-connection module 204, a network-communication module 206, and a facial-recognition application module 208.

Camera 202 can be responsible for capturing facial information of a customer. In order to capture the facial information, camera 202 can take a still photo or a video clip of the customer's face. In some embodiments, in addition to two-dimensional (2D) facial information, camera 202 is capable of capturing three-dimensional (3D) information of a customer's face. For example, camera 202 can perform a 3D scan to extract topology information of the customer's face. Various 3D imaging techniques can be used, such as applying structured-light illumination or using multiple cameras. The scope of this disclosure is not limited by the technique used to capture the customer's facial information.

POS-connection module 204 can be responsible for establishing and maintaining a communication link between facial-information-collection device 200 and a POS terminal. If the communication link is wired, POS-connection module 204 can include a USB or PCIE interface. If the communication link is wireless, POS-connection module 204 can include a Bluetooth interface or a WiFi interface.

Network-communication module 206 can be responsible for facilitating the coupling between facial-information-collection device 200 and a network, through which facial-information-collection device 200 can communicate with a remote face-payment server. Network-communication module 206 can include various network interfaces, such as an Ethernet interface or a WiFi interface.

Facial-recognition application module 208 can be responsible for performing various client-side operations of a facial-recognition application. For example, facial-information-collection module 208 can be responsible for extracting feature vectors from face images captured by camera 202 and for transmitting the feature vectors and/or images to a remote server that performs the server side operations of the facial-recognition application. In some embodiments, feature extraction can also be performed at the server side.

Facial-information-collection device 200 can optionally include modules for receiving user input, such as a keyboard and a touchscreen display. For example, a user can enter a command to start up facial-information-collection device 200 via the keyboard or the touchscreen display, or the user can enter additional information that can be used to further validate the identity of the user.

Figure 3:
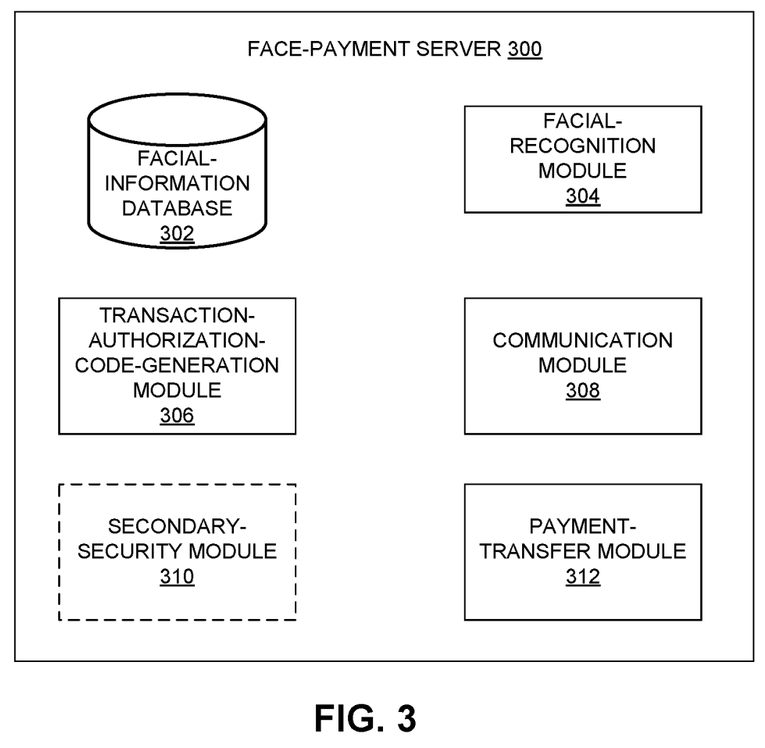
FIG. 3 illustrates a block diagram of an exemplary face-payment server, according to one embodiment.

FIG. 3 illustrates a block diagram of an exemplary face-payment server, according to one embodiment. Face-payment server 300 can include a facial-information database 302, a facial-recognition module 304, a transaction-authorization-code-generation module 306, a communication module 308, an optional secondary-security module 310, and a payment-transfer module 312.

Facial-information database 302 can store facial information associated with a number of account holders. When a user or customer creates a payment account that enables paying-with-a-face, the user can upload his facial information (e.g., images of his face) to face-payment server 300 to allow his facial information to be stored in facial-information database 302. Alternatively, a user or customer may link an existing financial account (e.g., a bank account or a credit card account) to an account with face-payment server 300 by submitting information associated with his financial account and his facial information. Depending on the type of facial-recognition algorithm used by the system, the facial information stored in facial-information database may have different formats. In some embodiments, a user's facial information can include information associated with landmarks on a face (e.g., eyebrows, eyes, nose, mouth, etc.), such as the sizes and relative distances of the landmarks. In alternative embodiments, a user's facial information can include 3D topology data (e.g., height of the nose or cheek) of his face. In some embodiments, facial-information database 302 may store raw images of customers' faces.

Facial-recognition module 304 can be responsible for obtaining facial information of a customer collected by a facial-information-collection device and for performing a facial-recognition operation based on the obtained facial information. When performing the facial-recognition operation, facial-recognition module 304 compares the obtained facial information with facial information stored in facial-information database 302 in order to identify the customer. In some embodiments, facial-recognition module 304 can implement various facial-recognition algorithms, such as an algorithm that uses feature extraction and clustering to recognize faces or a deep-learning algorithm. The scope of this disclosure is not limited by the actual implementation of the facial-recognition algorithm. Once a customer is recognized based on his facial information, facial-recognition module 304 can also obtain account information associated with this customer. The account information can include information associated with the user's payment account (e.g., account number or user ID) on face-payment server 300 or information associated with the user's linked financial account (e.g., a bank account or a credit card account).

Transaction-authorization-code-generation module 306 can be responsible for generating a transaction-authorization code. More specifically, such a code can be specific to the identified user or customer. During operation, based on the account information associated with the identified user or customer, transaction-authorization-code-generation module 306 first verifies the validity of the user account (e.g., whether the account is active or whether there is sufficient fund available). If the account is validated, a user-specific transaction-authorization code is generated. Otherwise, an error code is generated. The transaction-authorization code used here by face-payment server 300 can be similar to other types of transaction-authorization code used by traditional POS payment systems, such as a POS system that processes credit or debit cards. The transaction-authorization code can indicate to the POS terminal (or the store clerk operating the POS terminal) that a financial account has been verified and a payment can be submitted. Note that, if facial-recognition module 304 cannot recognize the face of the customer, transaction-authorization-code-generation module 306 also generates an error code. The error code can be sent back to and displayed on a display of the facial-information-collection device, prompting the customer to take other actions, such as rendering a different form of payment.

Communication module 308 can be responsible for coupling face-payment server 300 to the network, thus facilitating the communication between face-payment server 300 and the facial-information-collection device, which is located at the POS. Moreover, face-payment server 300 can also communicate with other financial institutions (e.g., a bank or a credit card issuer) in order to verify the account information and transfer fund.

Optional secondary-security module 310 can be responsible for implementing a secondary security measure. More specifically, to enhance security, in addition to the facial information, the system may require additional user input (e.g., a PIN (personal identification number) or a phone number) to further verify the identity of the user. Secondary-security module 310 can compare the collected user input with previously stored user information to verify the user identity. In some embodiments, such user information (e.g., the PIN or phone number) can be stored in facial-information database 302 along with the facial information of the user.

Payment-transfer module 312 can be responsible for transferring the payment from the user's account to the merchant's account. If the user's account is a linked account from a financial institution (e.g., a bank), payment-transfer module 312 can access the user's account with the financial institution to transfer fund.

Note that FIG. 3 illustrates various functional blocks of face-payment server 300 that pertain to the paying-with-a-face application. Face-payment server 300 can also include additional components that are not shown in FIG. 3, such as display or input modules. Moreover, although shown as a single unit in FIG. 3, payment-server 300 can be implemented using a cloud-computing technology, meaning that, instead of a single computer, payment-server 300 may be implemented by a plurality of interconnected computers distributed in the cloud. For example, the different functional blocks (e.g., facial-information database 302, facial-recognition module 304, and transaction-authorization-code-generation module 306) may be located in a number of geographically separated data centers.

Figure 4:
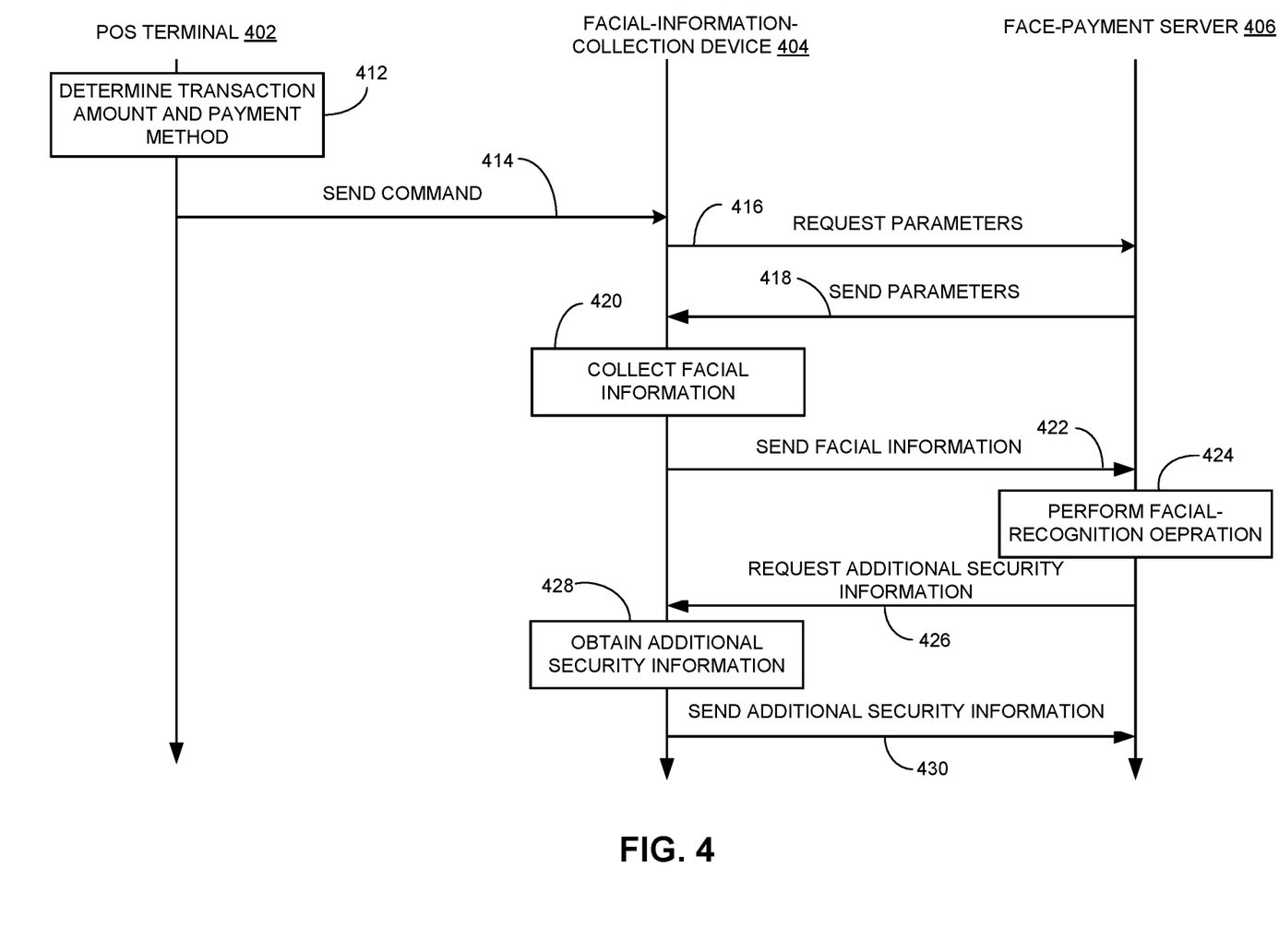
FIG. 4 presents a time-space diagram illustrating an exemplary process of paying-with-a-face, according to one embodiment.

FIG. 4 presents a time-space diagram illustrating an exemplary process of paying-with-a-face, according to one embodiment. During operation, a POS terminal 402 determines a transaction amount and a payment method (operation 412). In a retail setting, the POS terminal can scan the merchandizes and calculate a payment sum. In a service setting, such as a restaurant, a person providing the service can input an amount charged for the service. The payment method can include paying with cash, paying with a credit or debit card, or paying with a face. If the payment method is the paying-with-a-face method, POS terminal 402 sends a command to facial-information-collection device 404 to start up or turn on facial-information-collection device 404 (operation 414). Such a command can be sent in response to the customer or the store clerk making a selection at POS terminal 402, such as tapping an icon on a touchscreen display of POS terminal 402. Facial-information-collection device 404 may be in a hibernation mode before receiving the start-up or turn-on command in order to save power.

In response to receiving the start-up or turn-on command, facial-information-collection device 404 sends a request to face-payment server 406 to request a set of parameters for collecting the customer's facial information (operation 416). In response, face-payment server 406 sends the requested parameters back to facial-information-collection device 404 (operation 418). Depending on the type of facial-recognition operation performed by face-payment server 406, different types of facial information may be needed from facial-information-collection device 404. For example, if the facial-recognition operation requires 3D information associated with the customer's face, face-payment server 404 may send parameters that instruct facial-information-collection device 404 what type of 3D facial information is needed. On the other hand, if the facial-recognition operation only requires 2D information associated with the customer's face, face-payment server 404 may send parameters that instruct facial-information-collection device 404 to submit 2D images based on the parameters or 2D feature vectors based on the parameters.

Facial-information-collection device 404 then collects facial information of the customer based on the received parameters (operation 420) and send the collected facial information to face-payment server 406 (operation 422). In some embodiments, in addition to a camera, facial-information-collection device 404 can also include a display that can display the captured images of the user's face to the user or customer. The display may also display user prompts that instructing the user to perform certain tasks, such as instructing the user to face the camera or instructing the user to turn his face at a certain angle. In some embodiments, the parameters received by facial-information-collection device 404 may also include parameters used for detection of liveness. In such a scenario, facial-information-collection device 404 can display instructions that prompt the user to perform certain facial movements, such as winking, opening or closing the mouth, etc. In alternative embodiments, the user prompt may be delivered to the user through voice commands.

Face-payment server 406 receives facial information of the customer from facial-information-collection device 404 and performs a facial-recognition operation to identify the customer and an account associated with the customer (operation 424). If the face is not recognized, face-payment server 406 can send an error message back to facial-information-collection device 404, which may display such an error message to the customer. In some embodiments, facial-information-collection device 404 may forward the error message to POS terminal 402 to allow the customer to select a different payment method using POS terminal 402. For example, if the face is not recognized, the customer may choose to pay with cash or use a credit card.

Face-payment server 406 may request additional security information from facial-information-collection device 404 (operation 426). The additional security information may include a PIN or a phone number associated with the customer. Other types of user information, such as the number of the user's ID, an answer to a predetermined question, etc., can also be used as the additional security information for validating the customer's identify. Facial-information-collection device 404 obtains the additional security information (operation 428) and sends such information to face-payment server 406 (operation 430). For example, the customer can enter a PIN or phone number using the touchscreen display of facial-information-collection device 404. Operations 426-430 can be optional. In a low-risk environment, face-payment server 406 may not request additional security information.

Face-payment server 406 verifies the customer's identity based on the additional security information and generates a transaction-authorization code (authcode) (operation 432). Such a transaction-authorization code can be similar to the authorization code used by traditional POS systems to process credit card payment, where the issuing entity of the credit card sends an authorization code to the merchant to approve or authorize the sale. The transaction-authorization code can be specific to the customer and/or the transaction. Moreover, the transaction-authorization code can be recognizable by POS terminal 402. Face-payment server 406 sends the transaction-authorization code to facial-information-collection device 404 (operation 434). Note that, if face-payment server 406 fails to generate an authorization-transaction code, face-payment server 406 can send an error message to facial-information-collection device 404. For example, if there is insufficient fund in the account of the identified customer, an error message can be generated and sent by face-payment server 406 to facial-information-collection device 404.

Subsequent to receiving the transaction-authorization code, facial-information-collection device 404 receives a confirmation command from the customer (operation 436). In some embodiments, facial-information-collection device 404 may display a message to the customer, indicating that a certain amount of fund will be transferred from the customer's account (e.g., a direct account associated with face-payment server 406 or a credit card account linked to the customer account). Subsequent to receiving the user confirmation, facial-information-collection device 404 forwards the transaction-authorization code to POS terminal 402 (operation 438).

Upon receiving the transaction-authorization code, POS terminal 402 can send a payment request to face-payment server 406 using the transaction-authorization code (operation 440). This operation can be similar to the operation performed by POS terminal 402 in situations where a credit card payment is made. Upon receiving the payment request, face-payment server 406 transfers the requested fund from the customer's account to the vendor's account (operation 442) and sends a payment result to POS terminal 402 and facial-information-collection device 404 (operation 444). Facial-information-collection device 404 can display the payment result to the user (operation 446). In addition, a paper or electronic receipt can also be generated by POS terminal 402 (operation 448).

One can see from FIG. 4 that the operations of POS terminal 402 are very similar to operations of conventional POS terminals, except that POS terminal 402 additionally communicates with facial-information-collection device 404. Instead of directly receiving the transaction-authorization code from a payment server, POS terminal 402 receives the transaction-authorization code from facial-information-collection device 404. Other than establishing a connection to facial-information-collection device 402 (which can be done by configuring an existing networking module on the POS terminal), there is no need to modify the hardware of a convention POS terminal to implement the paying-with-a-face technology, making the current solution cost effective. More specifically, during implementation, a merchant can simply purchase a facial-information-collection device and couple the facial-information-collection device to a standard POS terminal using an existing networking module on the standard POS terminal. The merchant may need to install software needed for the paying-with-a-face application on the POS terminal. However, cost associated with the facial-information-collection device and software upgrade of the POS terminal is much lower than what is needed to purchase a new POS terminal that is capable of obtaining and processing facial information.

In a scenario where a supermarket implements the paying-with-a-face technology using an existing POS terminal, one can connect the existing POS terminal to a face-recognize device using a USB connection. The software installed on the existing POS terminal has been upgraded such that the POS terminal can operate along with the facial-information-collection device. During operation, a customer can bring to-be-purchased merchandises to the POS terminal, which can be a self-served terminal or a clerk-operated terminal. If it is a self-served terminal, the customer can scan, using an optical scanner associated with the POS terminal, barcodes of the merchandises. The POS terminal calculates the total amount of payment needed to purchase the merchandises and presents to the customer a number of payment options. These operations of the POS terminal are similar to standard POS operations Like a standard POS terminal, subsequent to the customer selecting a payment option and submitting the payment accordingly, the POS terminal is waiting to receive a transaction-authorization code from the remote payment server and can then submit the payment request using the received transaction-authorization code.

One of the payment options displayed to the customer is the paying-with-a-face payment option. In response to the customer selecting such a payment option, the POS terminal can send a start-up command to the coupled facial-information-collection device. Alternatively, the customer or store clerk can enter the start-up command via a touchscreen display, a keyboard, or a pointing device associated with the facial-information-collection device. Upon receiving the start-up command, the facial-information-collection device can perform the following operations that are unique to the paying-with-a-face application.

Figure 5:
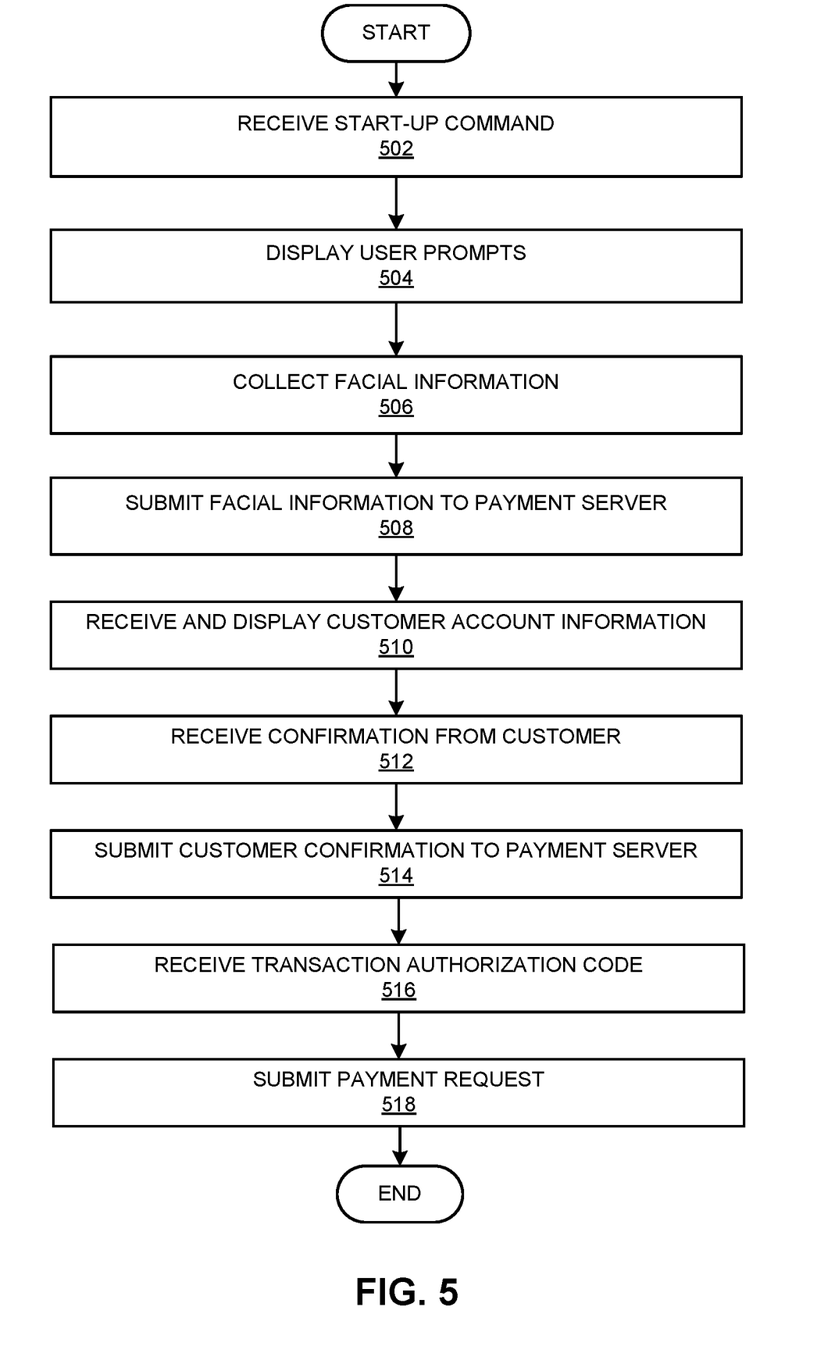
FIG. 5 presents a flowchart illustrating exemplary operations of a facial-information-collection device, according to one embodiment.

FIG. 5 presents a flowchart illustrating exemplary operations of a facial-information-collection device, according to one embodiment. During operation, a facial-information-collection device receives a start-up command (operation 502). In response to the start-up command, the facial-information-collection device displays user prompts, instructing the customer to face a camera on the facial-information-collection device (operation 504). Facial-information-collection device subsequently collects, via the camera or a face-scanning device, the customer's facial information (operation 506). Depending on the actual implementation, the facial-information-collection device may collect different types of facial information, including both 2D and 3D facial information. In some embodiments, the facial information can include one or more images (e.g., 2D or 3D images) of the customer's face. Alternatively, the facial information can include various features extracted from images of the customer's face. Note that, due to privacy concerns, in some embodiments, instead of taking images of customer's face, the facial-information-collection device can extract, from the customer's face, facial features (e.g., sizes and/or relative distances of the various landmarks) and generate feature vectors to represent facial information of the customer.

The facial-information-collection device then submits the facial information (e.g., feature vectors or images) to a remote face-payment server (operation 508), which uses the customer's facial information to identify the customer and an account associated with the customer.

The facial-information-collection device receives the customer account information from the remote payment server and displays such account information to the customer to allow the customer to confirm that it is his account (operation 510). To ensure privacy, the customer account information may be partially displayed. The facial-informationcollection device receives a confirmation from the customer (operation 512) and submits the customer's confirmation to the remote payment server (operation 514). Upon receiving the customer's confirmation, the remote payment server can generate and send a transaction-authorization code to the facial-information-collection device. Face-authorization device receives, from the remote payment server, the transaction-authorization code (operation 516) and then submits a payment request using the transaction-authorization code (operation 518). Upon receiving the payment request accompanied by the transaction-authorization code, the remote payment server can execute the payment by transferring the appropriate amount of fund from the customer's account to the vendor's account.

In the aforementioned examples, the face-payment system includes a POS terminal. In alternative embodiments, the face-payment system may not necessarily include a POS terminal. Instead, the facial-information-collection device within the face-payment system may include additional modules that can perform various POS functions, such as scanning merchandises, calculating a payment sum, and requesting fund transfer. In other words, facial-information-collection device 102 and POS terminal 104 shown in FIG. 1 can be integrated into a single device, sometimes referred to as an integrated face-payment terminal. The integrated face-payment terminal can perform standard POS functions as well as functions needed for the paying-with-a-face application. In some embodiments, to lower the cost, the integrated face-payment terminal can have reduced POS functions. For example, the integrated face-payment terminal does not need to store merchandise information and a user can manually input a payment sum.

Figure 6:
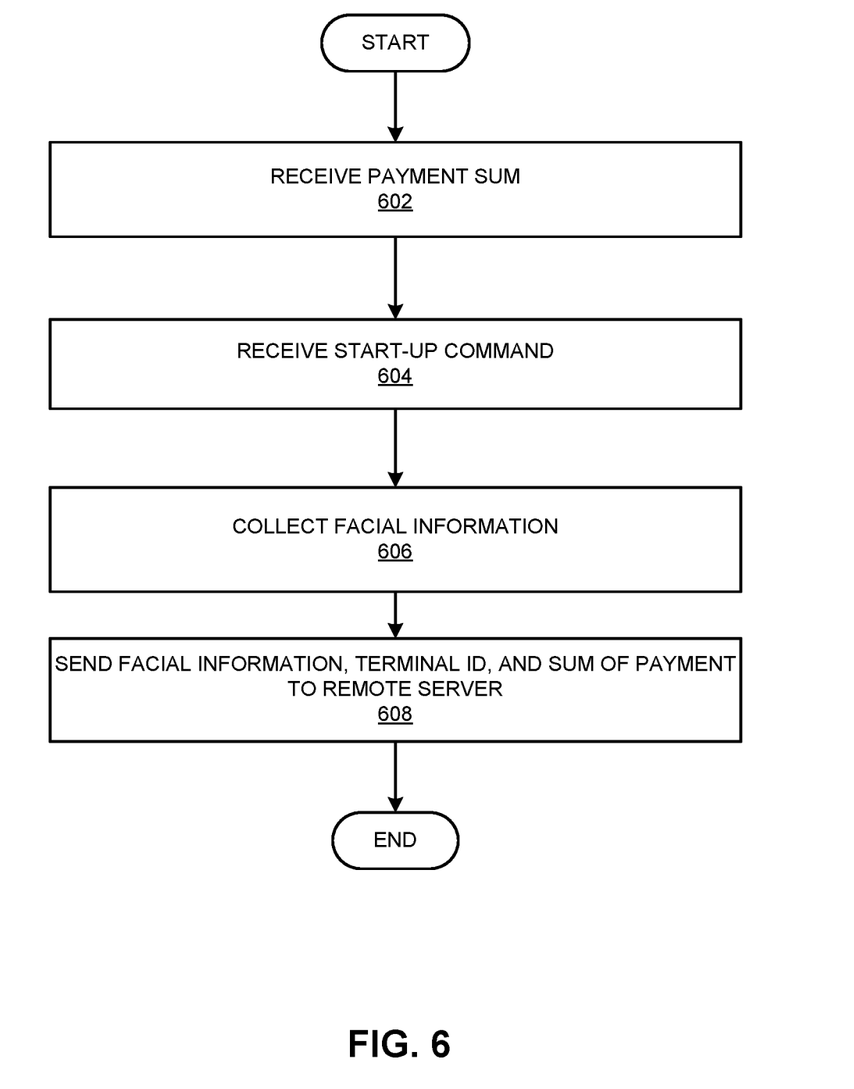
FIG. 6 presents a flowchart illustrating exemplary operations of an integrated face-payment terminal, according to one embodiment.

FIG. 6 presents a flowchart illustrating exemplary operations of an integrated face-payment terminal, according to one embodiment. During operation, the integrated face-payment terminal of a vendor receives a payment sum (operation 602). Such a payment sum can be entered manually by a user, which can be the customer or the vendor. The integrated face-payment terminal can then receive a start-up command for starting the paying-with-a-face payment operation (operation 604). Such a command can be inputted by a user using a touchscreen display, a keyboard, or a pointing device associated with the integrated face-payment terminal. Subsequent to starting up, the integrated face-payment terminal collects facial information of a customer (operation 606). The facial information can include facial features or images of the customer's face.

The integrated face-payment terminal can then send the facial information of the customer, the identification information of the integrated face-payment terminal (e.g., a unique device ID), and the payment sum to a remote payment server (operation 608). The unique device ID can be bound to a financial account of the vendor to allow the remote payment server to identify the vendor's account based on the device ID. Various techniques can be used to bind the unique device ID to the vendor's financial account. For example, during the initialization of the integrated face-payment terminal, the vendor can input its account information. Alternatively, the unique device ID of the face-payment terminal can be displayed using a QR code (either on a display of the integrated face-payment terminal or on a label attached to the terminal), and the vendor can scan the QR code to obtain the device ID. This way a payment application running on the vendor's computing device can recognize the terminal and bind the terminal ID with the vendor's financial account such that payment submitted through this terminal will be deposited to the corresponding vendor's financial account.

Figure 7:
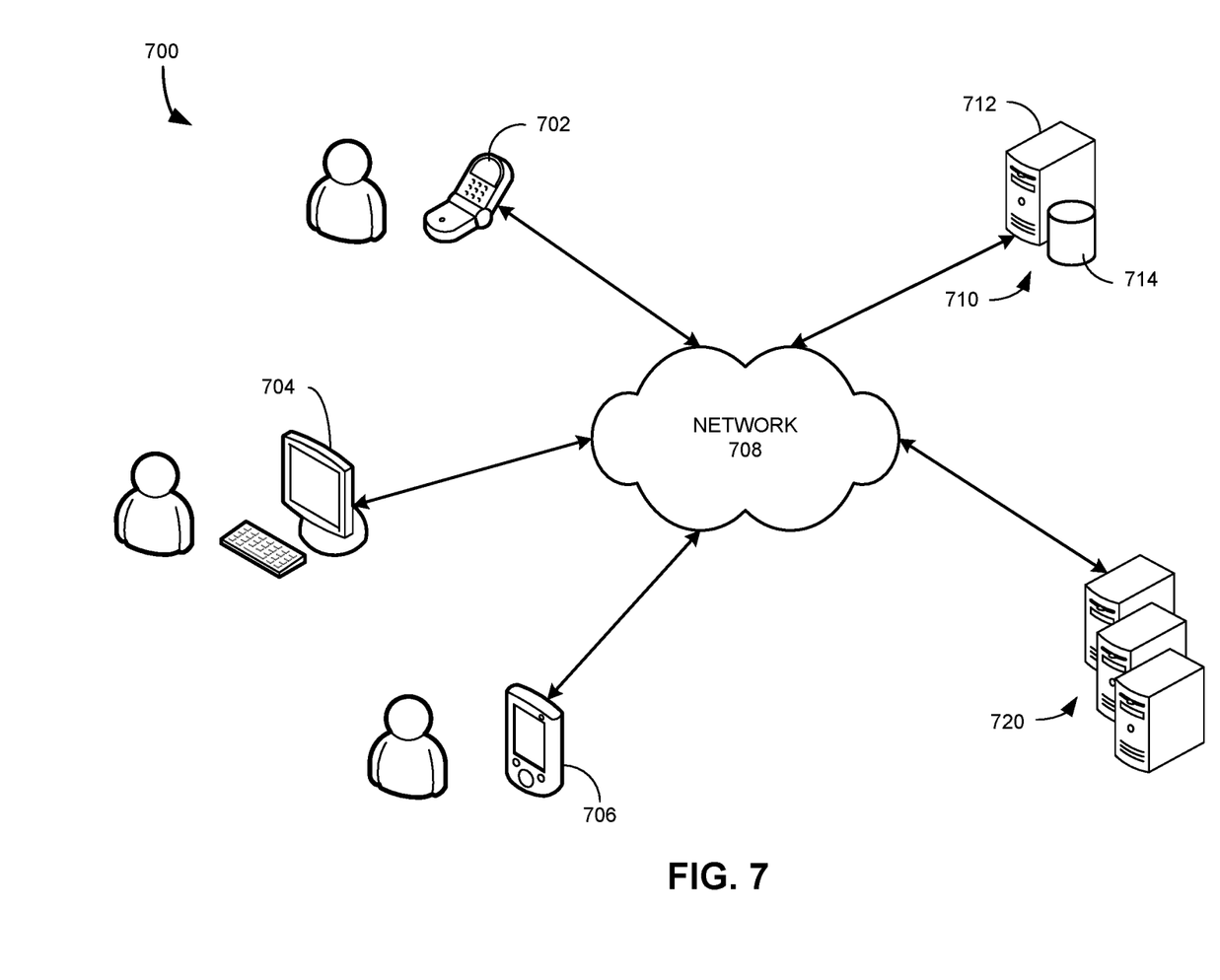
FIG. 7 illustrates an exemplary network environment for implementing the disclosed technology, in accordance with some embodiments described herein.

FIG. 7 illustrates an exemplary network environment for implementing the disclosed technology, in accordance with some embodiments described herein. A network environment 700 includes a number of electronic devices 702, 704 and 706 communicably connected to a server 710 by a network 708. One or more remote servers 720 are further coupled to the server 710 and/or the one or more electronic devices 702, 704 and 706.

In some exemplary embodiments, electronic devices 702, 704 and 706 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 702, 704 and 706 store a user agent such as a browser or application. In the example of FIG. 7, electronic device 702 is depicted as a smartphone, electronic device 704 is depicted as a desktop computer, and electronic device 706 is depicted as a PDA.

Server 710 includes a processing device 712 and a data store 714. Processing device 712 executes computer instructions stored in data store 714, for example, to assist in scheduling a customer-initiated service or a service-provider-initiated service between a service provider and a customer at electronic devices 702, 704 and 706 during a service scheduling process.

In some exemplary aspects, server 710 can be a single computing device such as a computer server. In other embodiments, server 710 can represent more than one computing device working together to perform the actions of a server computer (e.g., cloud computing). The server 710 may host the web server communicably coupled to the browser at the client device (e.g., electronic devices 702, 704 or 706) via network 708. In one example, the server 710 may host a client application for scheduling a customer-initiated service or a service-provider-initiated service between a service provider and a customer during a service scheduling process. Server 710 may further be in communication with one or more remote servers 720 either through the network 708 or through another network or communication means.

The one or more remote servers 720 may perform various functionalities and/or storage capabilities described herein with regard to the server 710, either alone or in combination with server 710. Each of the one or more remote servers 720 may host various services. For example, servers 720 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Server 710 may further maintain or be in communication with social networking services hosted on one or more remote servers 720. The one or more social networking services may provide various services and may enable users to create a profile and associate themselves with other users at a remote social networking service. The server 710 and/or the one or more remote servers 720 may further facilitate the generation and maintenance of a social graph including the user-created associations. The social graphs may include, for example, a list of all users of the remote social networking service and their associations with other users of a remote social networking service.

Each of the one or more remote servers 720 can be a single computing device such as a computer server or can represent more than one computing device working together to perform the actions of a server computer (e.g., cloud computing). In one embodiment server 710 and one or more remote servers 720 may be implemented as a single server or a cluster of servers. In one example, server 710 and one or more remote servers 720 may communicate through the user agent at the client device (e.g., electronic devices 702, 704 or 706) via network 708.

Users may interact with the system hosted by server 710, and/or one or more services hosted by remote servers 720, through a client application installed at the electronic devices 702, 704, and 706. Alternatively, the user may interact with the system and the one or more social networking services through a web-based browser application at the electronic devices 702, 704, and 706. Communication among client devices 702, 704, 706 and the system, and/or one or more services, may be facilitated through a network (e.g., network 708).

Communication among the client devices 702, 704, 706, server 710 and/or one or more remote servers 720 may be facilitated through various communication protocols. In some aspects, client devices 702, 704, 706, server 710 and/or one or more remote servers 720 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 708 can include, for example, any one or more of a personal area network (PAN), a local area network (LAN), a campus area network (CAN), a metropolitan area network (MAN), a wide area network (WAN), a broadband network (BBN), the Internet, and the like. Further, network 708 can include, but is not limited to, any one or more of the following network topologies, including a bus network, a star network, a ring network, a mesh network, a star-bus network, a tree or hierarchical network, and the like.

Figure 8:
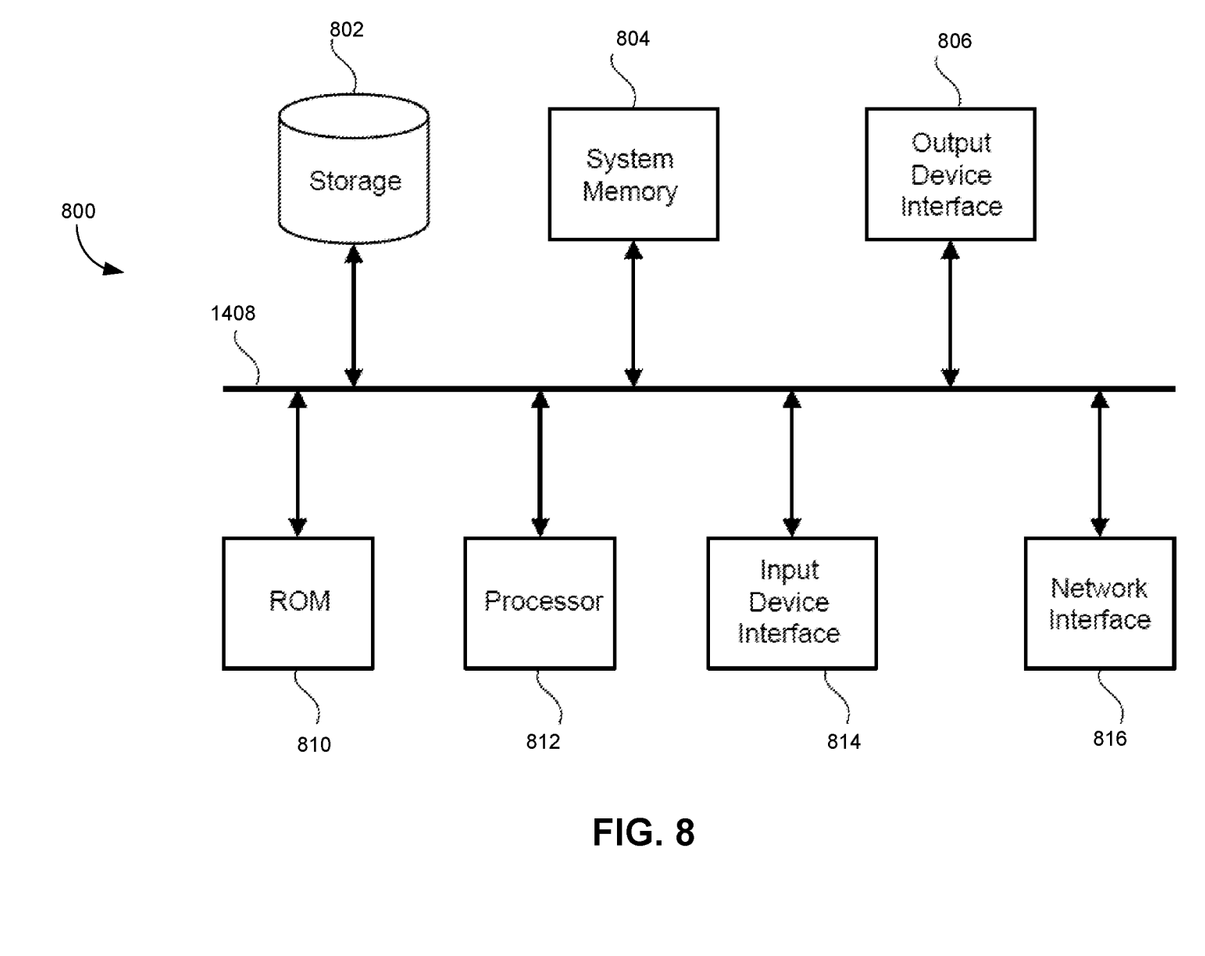
FIG. 8 conceptually illustrates an electronic system with which the subject technology is implemented, in accordance with some embodiments described herein.

FIG. 8 conceptually illustrates an electronic system with which the subject technology is implemented, in accordance with some embodiments described herein. Electronic system 800 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 800 includes a bus 808, processing unit(s) 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of electronic system 800. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. From these various memory units, processing unit(s) 812 retrieves instructions to execute and data to process in order to execute the processes of some implementations.

Bus 808 also connects to input and output device interfaces 814 and 806, respectively. Input device interface 814 enables the user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as cathode ray tubes (CRTs) or liquid crystal displays (LCDs). Some implementations include devices such as a touchscreen that function as both input and output devices.

Finally, as shown in FIG. 8, bus 808 also couples electronic system 800 to a network (not shown) through a network interface 816. In this manner, the computer can be a part of a network of computers (such as a local area network ("LAN"), a wide area network ("WAN"), or an intranet, or a network of networks, such as the Internet. Any or all components of electronic system 800 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitries. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A payment-processing apparatus, comprising:
    a camera module;
        a first communication interface configured to receive, from a standalone point-of-sale (POS) terminal, a start-up command for starting up the payment-processing apparatus; and
        a second communication interface configured to:
            request, from a remote computing device,
            a type of facial information needed to perform a facial-recognition operation at the remote computing device, in response to the first communication interface receiving the start-up command from the standalone POS terminal;
                receive, from the remote computing device, facial-recognition parameters specific to the type of facial information needed to perform the facial-recognition operation, wherein the received facial recognition parameters comprise at least a liveness-detection parameter;
    wherein the camera module is configured to turn on to collect facial information of a customer based on the received facial-recognition parameters in response to the first communication interface receiving the start-up command from the standalone POS terminal;
    wherein the second communication interface is further configured to send the collected facial information to the remote computing device, thereby allowing the remote computing device to perform the facial-recognition operation to identify a customer account based on the collected facial information; and
    wherein the POS terminal completes a transaction based on the identified customer account.

2. The payment-processing apparatus of claim 1, wherein the first communication interface comprises a universal serial bus (USB) interface, a Bluetooth™ interface, or a WiFi™ interface.

3. The payment-processing apparatus of claim 1, wherein the second communication interface is configured to receive, from the remote computing device, a transaction-authorization code, which is generated by the remote computing device based on the identified customer account.

4. The payment-processing apparatus of claim 3, wherein the first communication interface is configured to forward, to the standalone POS terminal, the transaction-authorization code to allow the standalone POS terminal to submit a payment request to the customer account based on the transaction-authorization code and a payment amount.

5. The payment-processing apparatus of claim 1, wherein the type of facial information comprises one or more of:
    a two-dimensional (2D) image;
    a three-dimensional (3D) image; and
    a feature vector.

6. The payment-processing apparatus of claim 1, further comprising an input module configured to receive additional security information from the customer.

7. The payment-processing apparatus of claim 6, wherein the second communication interface is further configured to transmit the additional security information to the remote computing device, thereby allowing the remote computing device to verify the customer's identity based on the additional security information.

8. The payment-processing apparatus of claim 1, further comprising a display module configured to:
    display information associated with the identified customer account; and
    display a payment result.

9. The payment-processing apparatus of claim 1, wherein the remote computing device comprises a facial information database storing facial information of a plurality of customers.

10. The payment-processing apparatus of claim 1, wherein the standalone POS terminal is configured to perform one or more of:
    determining price;
    calculating payment sum; and
    processing a coupon.

11. A computer-implemented payment-processing method, comprising:
    receiving, by a payment-processing device from a standalone point-of-sale (POS) terminal, a start-up command for starting up the payment-processing device, wherein the start-up command is received via a first communication interface between the payment-processing device and the standalone POS terminal;
    in response to receiving the start-up command, requesting, by the payment-processing device, from a remote computing device, a type of facial information needed to perform a facial-recognition operation to be performed by the remote computing device;
    receiving, via a second communication interface between the payment-processing device and the remote computing device, facial-recognition parameters specific to the type of facial information needed to perform the facial-recognition operation, wherein the received facial recognition parameters comprise at least a liveness-detection parameter;
    in response to receiving the start-up command and the facial-recognition parameters, obtaining, by a camera associated with the payment-processing device, facial information of a customer based on the received facial-recognition parameters;
    transmitting, by the payment-processing device, the facial information to the remote computing device via the second communication interface to allow the remote computing device to perform the facial-recognition operation to identify a customer account based on the facial information;
    receiving, from the remote computing device via the second communication interface, a transaction-authorization code associated with the customer account;
    forwarding, via the first communication interface, the transaction-authorization code to the standalone POS terminal; and
    completing, by the standalone POS terminal, a transaction based on the transaction-authorization code.

12. The computer-implemented method of claim 11, wherein the first communication interface comprises a universal serial bus (USB) interface, a Bluetooth™ interface, or a WiFi™ interface.

13. The computer-implemented method of claim 11, wherein the standalone POS terminal is configured to submit a payment request to the account associated with the customer based on the transaction-authorization code and a payment amount.

14. The computer-implemented method of claim 11, wherein the type of facial information comprises one or more of:
    a two-dimensional (2D) image;

a three-dimensional (3D) image; and a feature vector.

15. The computer-implemented method of claim 11, further comprising receiving additional security information from the customer.

16. The computer-implemented method of claim 15, further comprising transmitting the additional security information to the remote computing device to allow the remote computing device to verify the customer's identity based on the additional security information.

17. The computer-implemented method of claim 11, further comprising:

displaying information associated with the identified customer account; and displaying a payment result.

18. The computer-implemented method of claim 11, wherein the remote computing device comprises a facial information database storing facial information of a plurality of customers.

19. The computer-implemented method of claim 11, wherein the standalone POS terminal is configured to perform one or more of:

determining price;

calculating payment sum; and processing a coupon.

\* \* \* \* \*